(12) United States Patent
Rieger

(10) Patent No.: US 7,492,561 B2
(45) Date of Patent: Feb. 17, 2009

(54) PROTECTIVE CIRCUIT

(75) Inventor: Reinhard Rieger, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/801,299

(22) Filed: May 8, 2007

(65) Prior Publication Data

US 2007/0268648 A1 Nov. 22, 2007

(30) Foreign Application Priority Data

May 10, 2006 (DE) .................. 10 2006 021 747

(51) Int. Cl.
*H02H 3/20* (2006.01)
(52) U.S. Cl. .................. 361/91.5; 361/91.1; 361/111
(58) Field of Classification Search .............. 361/91.1, 361/91.5–91.8, 33, 56, 111
See application file for complete search history.

(56) References Cited

U.S. PATENT DOCUMENTS

| | | | | |
|---|---|---|---|---|
| 4,254,442 A | * | 3/1981 | Dijkmans et al. | 361/56 |
| 5,654,862 A | * | 8/1997 | Worley et al. | 361/111 |
| 7,130,175 B2 | * | 10/2006 | Dietz et al. | 361/111 |

* cited by examiner

*Primary Examiner*—Stephen W Jackson
*Assistant Examiner*—Terrence R Willoughby
(74) *Attorney, Agent, or Firm*—Kenyon & Kenyon LLP

(57) ABSTRACT

A protective circuit for protecting an electronic circuit from transient excess voltages, in particular, a series connection of at least two voltage-limiting circuit components being provided between a first connection terminal and a second connection terminal of an input of the protective circuit, each of the two voltage-limiting circuit components having at least one semiconductor element. At least one output terminal is provided at an output for connecting the electronic circuit to be protected to the protective circuit, the output terminal being connected to a circuit node disposed between the two voltage-limiting circuit components.

9 Claims, 2 Drawing Sheets

PROTECTIVE CIRCUIT

FIELD OF THE INVENTION

The present invention relates to a protective circuit for protecting an electronic circuit, in particular from transient excess voltages, in which a series connection of at least two voltage-limiting circuit components is provided between a first connection terminal and a second connection terminal of an input of the protective circuit, and each of the two voltage-limiting circuit components has at least one semiconductor component.

Furthermore, the present invention relates to an electronic circuit having a protective circuit of this type, and to a control device, especially for a motor vehicle.

BACKGROUND INFORMATION

Protective circuits of the type mentioned above usually have semiconductor components in the form of Zener diodes in the voltage-limiting circuit components, a corresponding series connection of such voltage-limiting circuit components in turn being connected in parallel to an input of the electronic circuit to be protected. If transient excess voltages occur at the input of the circuit to be protected, a Zener diode polarized in the non-conducting direction with respect to the excess voltage becomes conductive as soon as the excess voltage exceeds an avalanche voltage of the Zener diode. This limits the excess voltage to a value that roughly corresponds to the avalanche voltage of the particular Zener diode, possibly plus a forward voltage of another Zener diode polarized in the forward direction with respect to the excess voltage.

SUMMARY OF THE INVENTION

It is an object of the present invention to provide an improved protective circuit of the type mentioned above.

According to the present invention, in the protective circuit mentioned in the introduction this object is achieved by providing at least one output terminal at an output for connecting the electronic circuit to be protected to the protective circuit, the output terminal being connected to a circuit node lying between the two voltage-limiting circuit components.

The placement of the output terminal between the two voltage-limiting circuit components according to the present invention has the very advantageous result that there is a lower voltage load on the electronic circuit to be protected in the event of an excess voltage.

In the present invention, in contrast to conventional protective circuits, in an excess voltage event, the occurrence of a voltage level in the range of the avalanche voltage of a Zener diode used as voltage-limiting circuit component arises only if the polarity of the excess voltage corresponds to a non-conducting direction of the Zener diode.

In an excess voltage having a different polarity, the particular Zener diode at the input of the electronic circuit to be protected is correspondingly oriented in the forward direction, so that the excess voltage merely results in a voltage level that corresponds to the forward voltage of the Zener diode.

That is to say, the topology of the protective circuit according to the present invention advantageously reduces the number of such excess voltage situations at an input of the electronic circuit to be protected in which a voltage that corresponds to the avalanche voltage of the diodes is applied at the circuit to be protected. Given a corresponding polarity of the excess voltage, instead of the avalanche voltage, only a voltage level that corresponds to the forward voltage is advantageously applied at the circuit to be protected.

DETAILED DESCRIPTION

Figure 1A:
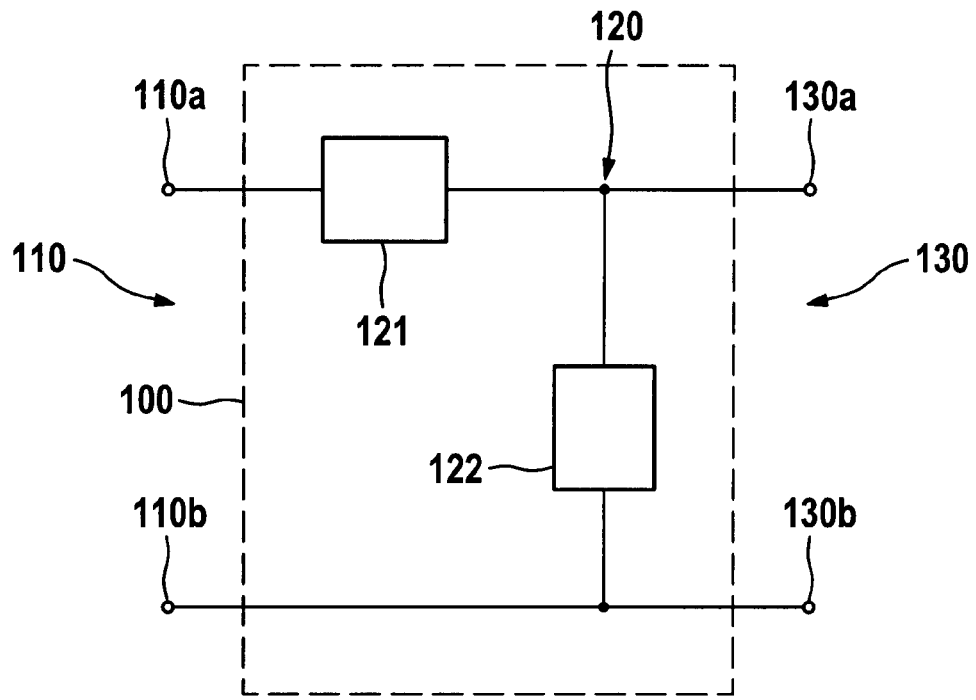
FIG. 1a schematically shows a first specific embodiment of the protective circuit according to the present invention.

FIG. 1a schematically shows a protective circuit 100 according to the present invention for protecting an electronic circuit connected to protective circuit 100; the electronic circuit is not shown in FIG. 1a and connected to protective circuit 100 according to the present invention via its output 130.

Protective circuit 100 according to the present invention has two voltage-limiting circuit components 121, 122, which are connected in series to one another with respect to an input 110 of protective circuit 100. In the case at hand, first voltage-limiting circuit component 121 is connected to a first connection terminal 110a, and second voltage-limiting circuit component 122 is connected to a second connection terminal 110b of input 110.

Protective circuit 100 according to the present invention is used, in particular, to protect a circuit, connected at its output 130, from transient excess voltages as they occur in electrical systems in a sudden deactivation of inductive loads, for instance, or also as a result of electrostatic discharges.

Figure 2:
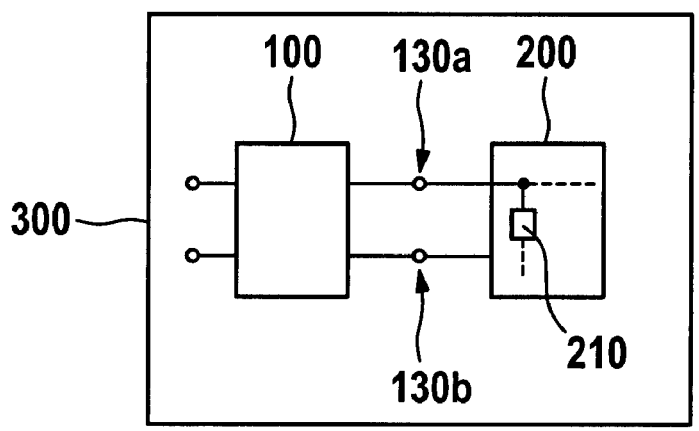
FIG. 2 schematically shows a control device according to the present invention.

As can be gathered from FIG. 2, protective circuit 100 according to the present invention is assigned to an electronic circuit 200, for example, which in turn is provided in a control device 300 to control operational sequences. For instance, control device 300 is a transmission control unit or an engine control unit of a motor vehicle.

Via its connection terminals 110a, 110b on its input side (FIG. 1a), protective circuit 100 is able to be connected to an electric energy supply (not shown) such as a vehicle electrical system. On the output side, as already described, electronic circuit 200 to be protected, cf. FIG. 2, is connected via connection terminals 130a, 130b to protective circuit 100 according to the present invention, via which it is therefore simultaneously supplied with electric energy from the vehicle electric system.

The placement of protective circuit 100 according to the present invention, illustrated in FIG. 2, allows an effective protection of electronic circuit 200 of control device 300 from transient excess voltages of the vehicle electrical system.

Figure 1B:
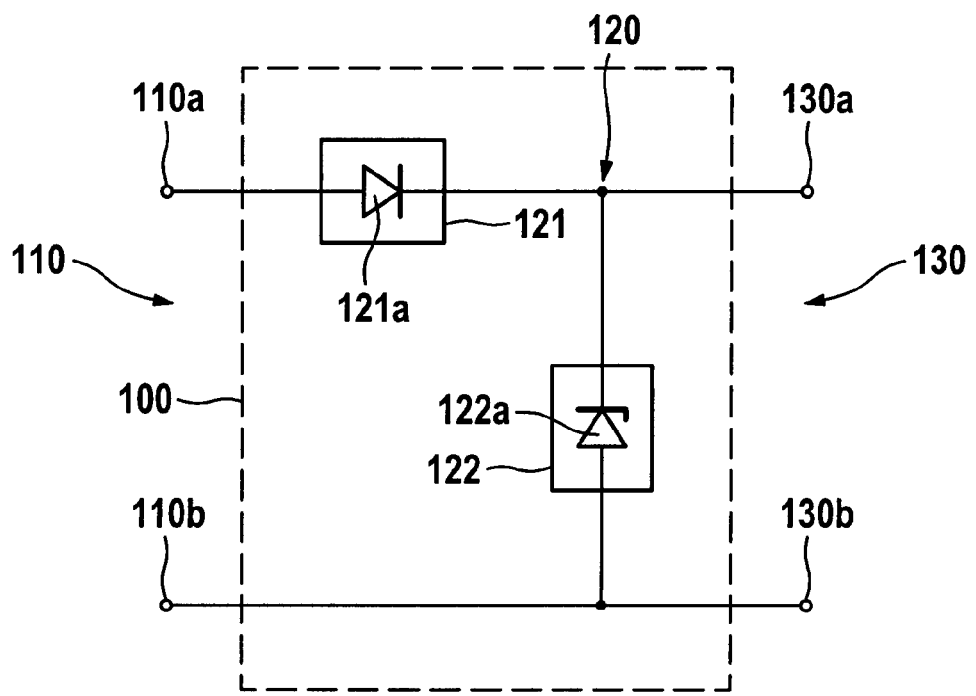
FIG. 1b shows another specific embodiment of the protective circuit according to the present invention.

FIG. 1b shows in detail an especially advantageous specific embodiment of protective circuit 100 according to the present invention. As can be gathered from FIG. 1b, voltage-limiting circuit components 121, 122 each have one diode 121a, 122a. First voltage-limiting circuit component 121, which is connected to a supply voltage of approximately 13.5 Volt of a vehicle electrical system via connection terminal 110a, has, in particular, a conventional semiconductor diode 121a, which assumes the function of a reverse-polarity protection for electronic circuit 200 to be protected (FIG. 2) or its connection terminal connected to output terminal 130a of protective circuit 100.

Second connection terminal 110b of protective circuit 100 according to the present invention is connected to a grounded connection of the not depicted vehicle electrical system. Accordingly, as illustrated in FIG. 1b, the ground potential of the vehicle electrical system is forwarded directly to electronic circuit 200 to be protected, with the aid of connection terminal 130b.

In contrast to first voltage-limiting circuit component 121, second voltage-limiting circuit component 122 has no conventional diode 121a, but instead a diode 122a in the form of a Zener diode. Since, due to the circuit setup of protective circuit 100 according to the present invention, second circuit component 122, or its Zener diode 122a, is disposed parallel to the input of electronic circuit 200 to be protected, second voltage-limiting circuit component 122 is advantageously able to realize a two-fold protective function.

On the one hand, second voltage-limiting circuit component 122 provides the functionality of a conventional reverse-polarity protection. That is to say, if the electric potential applied at connection terminal 110b, provided as grounded connection, is greater than the potential at circuit node 120 positioned between voltage-limiting circuit components 121, 122, then Zener diode 122a of second voltage-limiting circuit component 122 is polarized in the forward direction and therefore becomes conductive in order to reduce the potential at grounded connection terminal 110b.

On the other hand, because of its Zener diode 122a, second voltage-limiting circuit component 122 simultaneously constitutes a protective device of circuit 200 from, in particular, transient excess voltages having positive polarity.

Such transient excess voltages having positive polarity are characterized by, for instance, an increase in the potential at terminal connection 110a, which normally is at a voltage level of approximately 13.5 Volt, to 100 Volt or more for a relatively short period of time, which preferably lies in the micro-second range. In this case, virtually the entire potential, or an excess voltage that corresponds to the potential difference with respect to the ground potential, is present at second voltage-limiting circuit component 122, which, due to the exceeding of the avalanche voltage of Zener diode 122a provided therein, reduces the excess voltage. That is to say, electronic circuit 200 to be protected thus is exposed only to an excess voltage level that roughly corresponds to the avalanche voltage of Zener diode 122a.

In a corresponding negative excess voltage, diode 121a blocks and Zener diode 122a becomes conductive, so that electronic circuit 200 is not exposed to an excess voltage but instead, as already described, only to a voltage level that corresponds to the forward voltage of Zener diode 122a.

In other words, in addition to the twofold protective function provided by second voltage-limiting circuit component 122, the voltage load of circuit 200 in fault cases is advantageously reduced at the same time because, at least for excess voltages whose polarity corresponds to that of Zener diode 122a, not even the avalanche voltage of Zener diode 122a is applied at circuit 200, but only its usually considerably lower forward voltage.

In conventional protective circuits which provide, parallel to the input of circuit 200 to be protected, a series connection of Zener diodes disposed in an anti-parallel manner, for example, at least the avalanche voltage of one of the Zener diodes is disadvantageously applied in each fault case, but never solely its much lower forward voltage.

Figure 1C:
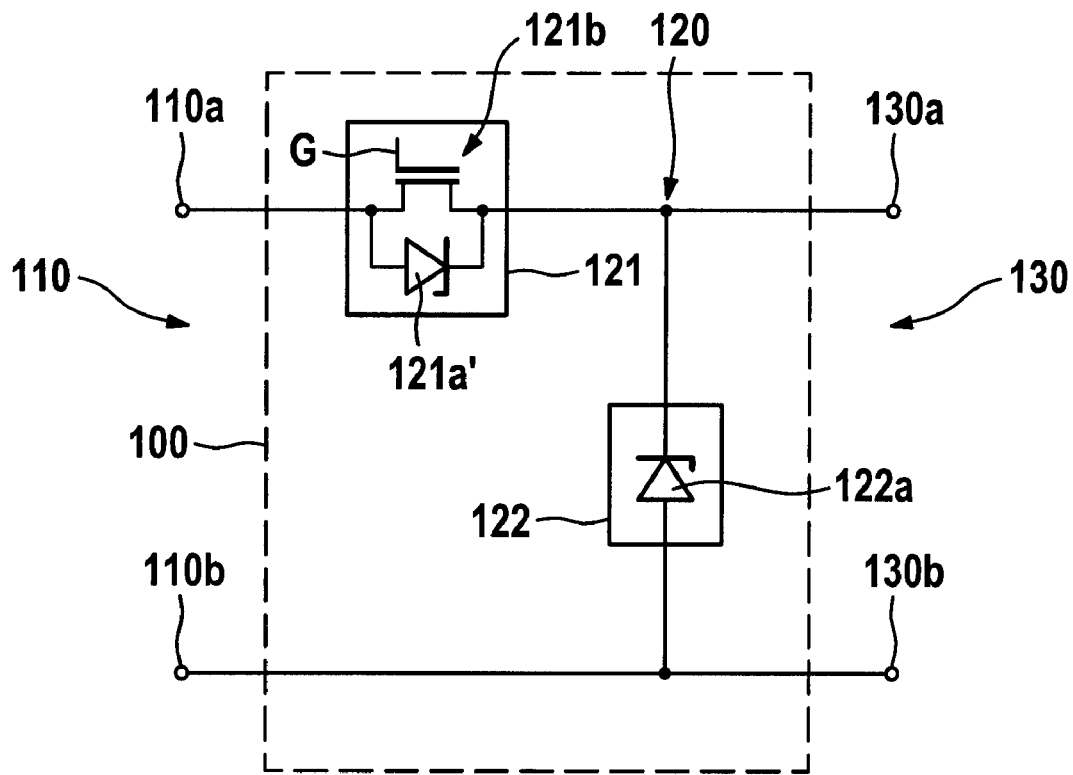
FIG. 1c shows another specific embodiment of the protective circuit according to the present invention.

In an additional, especially advantageous specific embodiment of protective circuit 100 according to the present invention, which is shown in greater detail in FIG. 1c, both voltage-limiting circuit components 121, 122 have a Zener diode 121a', 122a. This provides effective protection of electronic circuit 200 from transient excess voltages of both polarities.

In another, very advantageous specific embodiment of protective circuit 100 according to the present invention, it is also possible to provide a controllable resistor, preferably in first voltage-limiting circuit component 121, the resistor being embodied as field-effect transistor 121b in the case at hand. Field-effect transistor 121b is connected in parallel to Zener diode 121a' and, by a corresponding control of its gate electrode G, therefore allows a very low-resistance connection of connection terminal 110a to connection terminal 130a, for example. That is to say, a voltage drop at Zener diode 121a' corresponding to the forward voltage of Zener diode 121a' is able to be avoided by the use of field effect transistor 121b. Field-effect transistor 121b is preferably selected such that its drain source resistance in the switched-on state is much lower than the differential resistance of Zener diode 121a' in the forward direction.

In an especially advantageous manner it may also be provided that Zener diode 121a' is integrated in field-effect transistor 121b. In this case, first voltage-limiting circuit component 121 is realized entirely by field-effect transistor 121b having integrated Zener diode 121a'.

It is also conceivable to realize first voltage-limiting circuit component 121 by a field-effect transistor having an integrated conventional diode, which is used as free-wheeling diode.

In addition to the use of a semiconductor circuit, such as field-effect transistor 121b, it is also possible to provide other controllable resistors for bypassing diode path 121a, 121a' of first voltage-limiting circuit component 121.

In contrast to conventional protective circuits where the entire series connection of voltage-limiting circuit components 121, 122 is normally switched in parallel to connection terminals 130a, 130b, i.e., to the input of circuit 200 to be protected, only one of the two voltage-limiting circuit components is advantageously switched in parallel to electronic circuit 200 in protective circuit 100 according to the present invention. In the case at hand, according to FIG. 1c, if a transient excess voltage having negative polarity is present, only a voltage level that corresponds to the forward voltage of Zener diode 122a will be present at the input of electronic circuit 200 to be protected and not invariably, as in conventional protective circuits, a voltage level that corresponds to the avalanche voltage of one of the Zener diodes connected in series.

Instead of the afore-described Zener diodes 121a', 122a, any other suitable electronic components or semiconductor components that have a comparable current-voltage characteristic may be used to limit the voltage. It is also conceivable to use more complex, active circuits to realize voltage-limiting circuit components 121, 122.

In another very advantageous specific embodiment of the present invention, it is provided that at least one circuit component 210 (FIG. 2) of electronic circuit 200 connected to supply voltage input 110a (FIG. 1a) or 130a is designed in such a way that it is protected from transient excess voltage. If protective circuit 100 should fail, this provides increased operational safety of electronic circuit 200.

In particular, this also makes it possible to select voltage values that are as close as possible to a maximally permissible excess voltage for the avalanche voltage of Zener diodes 121a', 122a used in protective circuit 100 according to the present invention.

Zener diodes utilized in known protective circuits are usually dimensioned such that, given a maximally allowed excess voltage of 40 Volt, they have an avalanche voltage of, for instance, approximately 27 Volt in order to become conductive also at manufacture- or temperature-related fluctuations in the actual avalanche voltage before the excess voltage reaches the limit value of 40 Volt. Considerable current may flow due to the low differential resistance of the Zener diode in the breakdown range, the particular Zener diode having to convert a substantial amount of lost power.

By configuring circuit component 210, connected to supply voltage input 110a or 130a, with its own resistance with respect to transient excess voltages, in particular, Zener diodes 121a', 122a used in protective circuit 100 according to the present invention need no longer be so heavily overdimensioned, which results in lower costs for protective circuit 100.

At the same time, the design of circuit component 210 according to the present invention provides increased operational reliability with respect to transient excess voltages.

In another very advantageous embodiment of the present invention, the shunt conduction of an excess voltage in voltage-limiting circuit component 121, 122 may also be implemented with the aid of a controllable resistor such as a field-effect transistor 121b which, in the event of a transient excess voltage, must be appropriately controlled by a control logic in order to reduce the excess voltage occurring there.

Overall, protective circuit 100 according to the present invention makes it possible to provide effective protection from transient excess voltages for electronic circuits 200 as well as control devices 300 of any design, without this entailing disproportionally high additional expenditure with regard to electronic components.

What is claimed is:

1. A protective circuit to protect an electronic circuit from transient excess voltages, comprising:
    first and second connection terminals at an input of the protective circuit, the first connection terminal being connected to a supply voltage and the second connection terminal being grounded;
    a series connection of at least two voltage-limiting circuit components connected between the first connection terminal and the second connection terminal of the input of the protective circuit, each of the two voltage-limiting circuit components having at least one semiconductor element; and
    at least one output terminal situated at an output for connecting the electronic circuit to be protected to the protective circuit, the output terminal being connected to a circuit node situated directly between the two voltage-limiting circuit components, so that only one of the at least two voltage-limiting circuit components is connected in parallel to the electronic circuit; wherein the voltage-limiting circuit component connected in parallel to the electronic circuit consists of a Zener diode; wherein the voltage-limiting circuit component connected in parallel to the electronic circuit is directly connected to the second connection terminal; wherein the voltage-limiting circuit component not connected in parallel to the electronic circuit is directly connected to the supply voltage.

2. The protective circuit according to claim 1, wherein each of the two voltage-limiting circuit components has a diode, the diodes being connected to each other at their cathodes and forming the circuit node, at least one of the diodes being a Zener diode.

3. The protective circuit according to claim 2, wherein one of the voltage-limiting circuit components has a controllable resistor.

4. The protective circuit according to claim 1, wherein one of the voltage-limiting circuit components has a field-effect transistor.

5. The protective circuit according to claim 3, wherein the controllable resistor is connected in parallel to one of (a) the at least one semiconductor element and (b) the Zener diode.

6. The protective circuit according to claim 3, wherein one of (a) the semiconductor element and (b) the Zener diode is integrated in the controllable resistor.

7. An electronic circuit comprising:
    a protective circuit to protect the electronic circuit, the protective circuit including:
    first and second connection terminals at an input of the protective circuit, the first connection terminal being connected to a supply voltage and the second connection terminal being grounded,
    a series connection of at least two voltage-limiting circuit components connected between the first connection terminal and the second connection terminal of the input of the protective circuit, each of the two voltage-limiting circuit components having at least one semiconductor element, and
    at least one output terminal situated at an output for connecting the electronic circuit to be protected to the protective circuit, the output terminal being connected to a circuit node situated directly between the two voltage-limiting circuit components, so that only one of the at least two voltage-limiting circuit components is connected in parallel to the electronic circuit; wherein the voltage-limiting circuit component connected in parallel to the electronic circuit consists of a Zener diode, the output terminal being connected to a supply voltage input of the electronic circuit; wherein the voltage-limiting circuit component connected in parallel to the electronic circuit is directly connected to the second connection terminal; wherein the voltage-limiting circuit component not connected in parallel to the electronic circuit is directly connected to the supply voltage.

8. The electronic circuit according to claim 7, further comprising at least one circuit component connected to the supply voltage input designed such that it is protected from a transient excess voltage.

9. A control device for a motor vehicle, comprising:
    a protective circuit to protect an electronic circuit, the protective circuit including:
    first and second connection terminals at an input of the protective circuit, the first connection terminal being connected to a supply voltage and the second connection terminal being grounded,
    a series connection of at least two voltage-limiting circuit components connected between the first connection terminal and the second connection terminal of the input of the protective circuit, each of the two voltage-limiting circuit components having at least one semiconductor element, and
    at least one output terminal situated at an output for connecting the electronic circuit to be protected to the protective circuit, the output terminal being connected to a circuit node situated directly between the two voltage-limiting circuit components, so that only one of the at least two voltage-limiting circuit components is connected in parallel to the electronic circuit; wherein the voltage-limiting circuit component connected in parallel to the electronic circuit consists of a Zener diode; wherein the voltage-limiting circuit component connected in parallel to the electronic circuit is directly connected to the second connection terminal; wherein the voltage-limiting circuit component not connected in parallel to the electronic circuit is directly connected to the supply voltage.

* * * * *